Jan. 28, 1964 H. C. FOSTER 3,119,383

TARGET THROWING APPARATUS

Filed June 12, 1958 13 Sheets-Sheet 1

*INVENTOR.*
HARRY CLARK FOSTER

*BY*

Lionel L. Goff
HIS ATTORNEY

Jan. 28, 1964 H. C. FOSTER 3,119,383

TARGET THROWING APPARATUS

Filed June 12, 1958 13 Sheets-Sheet 2

INVENTOR.
HARRY CLARK FOSTER

BY [signature]
HIS ATTORNEY

Jan. 28, 1964 H. C. FOSTER 3,119,383

TARGET THROWING APPARATUS

Filed June 12, 1958 13 Sheets-Sheet 3

*INVENTOR.*
HARRY CLARK FOSTER

*BY* [signature]

HIS ATTORNEY

Jan. 28, 1964 H. C. FOSTER 3,119,383

TARGET THROWING APPARATUS

Filed June 12, 1958 13 Sheets-Sheet 4

INVENTOR.
HARRY CLARK FOSTER

BY Lionel E. Goff
HIS ATTORNEY

Jan. 28, 1964 | H. C. FOSTER | 3,119,383

TARGET THROWING APPARATUS

Filed June 12, 1958 | 13 Sheets-Sheet 5

*INVENTOR.*
HARRY CLARK FOSTER
*BY* [signature]
HIS ATTORNEY

INVENTOR.
HARRY CLARK FOSTER
BY Lionel E. Goff
HIS ATTORNEY

Jan. 28, 1964 H. C. FOSTER 3,119,383

TARGET THROWING APPARATUS

Filed June 12, 1958 13 Sheets-Sheet 7

INVENTOR.
HARRY CLARK FOSTER

BY Lionel E. Goff

HIS ATTORNEY

INVENTOR.
HARRY CLARK FOSTER
BY
Lionel B. Goff
HIS ATTORNEY

Jan. 28, 1964 H. C. FOSTER 3,119,383

TARGET THROWING APPARATUS

Filed June 12, 1958 13 Sheets-Sheet 9

*INVENTOR.*
HARRY CLARK FOSTER

*BY* Lionel E. Goff

HIS ATTORNEY

Jan. 28, 1964 H. C. FOSTER 3,119,383

TARGET THROWING APPARATUS

Filed June 12, 1958 13 Sheets-Sheet 10

*INVENTOR.*
HARRY CLARK FOSTER

*BY* Lionel E. Hoff

HIS ATTORNEY

Jan. 28, 1964 H. C. FOSTER 3,119,383
TARGET THROWING APPARATUS
Filed June 12, 1958 13 Sheets-Sheet 11

INVENTOR.
HARRY CLARK FOSTER
BY Lionel [signature]
HIS ATTORNEY

Jan. 28, 1964 H. C. FOSTER 3,119,383

TARGET THROWING APPARATUS

Filed June 12, 1958 13 Sheets-Sheet 12

*INVENTOR.*

HARRY CLARK FOSTER

*BY* Lionel E. Goff

HIS ATTORNEY

Jan. 28, 1964

H. C. FOSTER 3,119,383

TARGET THROWING APPARATUS

Filed June 12, 1958

13 Sheets-Sheet 13

INVENTOR.
HARRY CLARK FOSTER

BY

Lionel L. Goff

HIS ATTORNEY

United States Patent Office 3,119,383

Patented Jan. 28, 1964

3,119,383

TARGET THROWING APPARATUS

Harry Clark Foster, East Alton, Ill., assignor to Olin Mathieson Chemical Corporation, East Alton, Ill., a corporation of Virginia Filed June 12, 1958, Ser. No. 741,571
6 Claims. (Cl. 124—9)

This invention relates to target traps such as are used for throwing targets known as clay pigeons and more particularly to power driven traps wherein targets are automatically fed from a magazine to a throwing arm. This application is a continuation-in-part of copending application Serial No. 437,191, by Harry Clark Foster, filed June 16, 1954, now U.S. Letters Patent No. 2,925,812, granted February 23, 1960.

An object is to provide a target trap of simple and rugged construction with a minimum of parts.

It is also an object of this invention to provide a target trap with a novel magazine containing a large number of stacks of targets which are brought successively into register with the target throwing element.

A still further object of this invention is to provide a novel, relatively simple, inexpensive loading device operated in conjunction and in timed relation with and by the cocking and throwing mechanism.

A still further object of this invention is to provide a novel loading device capable of being used in conjunction with the target trap of the type wherein the throwing arm is returned to its cocked position by power means, and wherein the loading device operates in timed relation to movement of the throwing arm to initiate operation of the loading device.

Other objects and advantages of this invention will be apparent from the following description and drawings in which.

Figure 1:
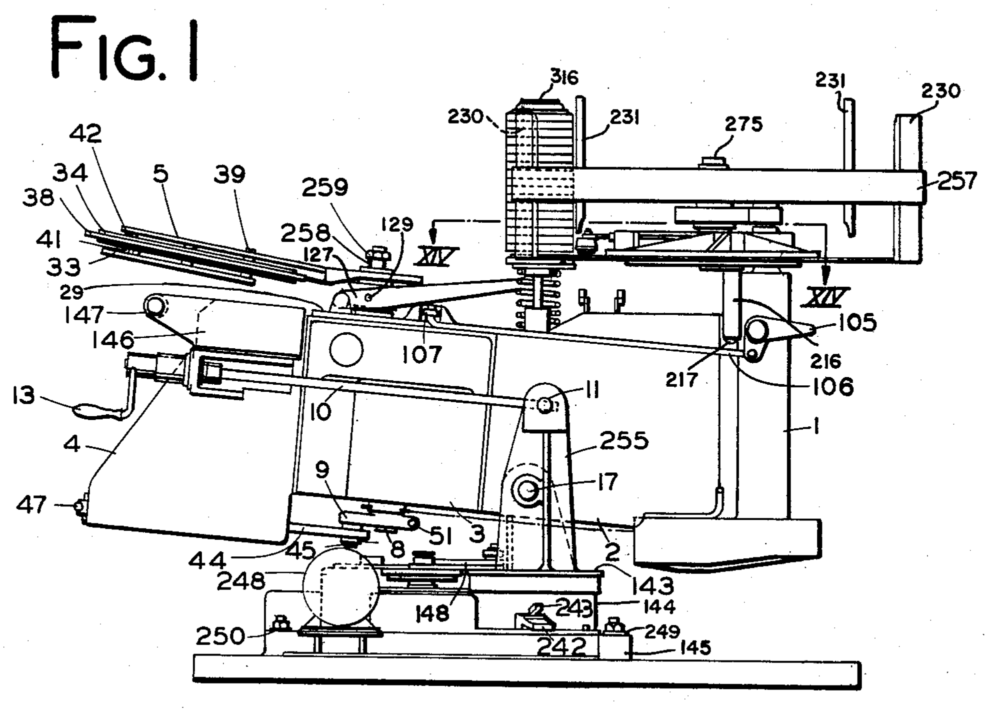
FIGURE 1 is a side elevation view of a preferred embodiment of the invention taken at the moment immediately after a target has been thrown.

In accordance with this invention, there is provided a trap powered by a continuously running motor which engages the trap mechanism through a clutch system to cock a spring which upon being released rotates the target throwing arm mounted upon a rotatable shaft located in the clutch system, to effect throwing of the target which is then followed by automatic loading of another target to the throwing arm as the result of continued movement of the mechanism. The loading of targets is facilitated by means of a rotary magazine containing a plurality of targets in annular arrangement in said magazine which is indexed by the rotation of the aforesaid shaft through a linkage arrangement interconnecting the magazine and the shaft. The sequence of target throwing, cocking of the mainspring of the trap, indexing of the magazine and reloading of the target throwing arm occurs substantially automatically in the apparatus upon release of the target throwing arm by the operator.

A second motor is provided which engages a novel gear arrangement which creates and transmits a non-uniform motion embodying intermittent acceleration, deceleration, reversing and hesitating motions to the target trap thereby continuously and independently oscillating the target trap in order to vary the distribution of the released targets.

The apparatus of this invention may be described generally as comprising a base 145, a sub-base 144, a frame support 143, a gear housing 3, a mainspring housing 4, a target carrier or throwing arm 5, a mainspring 6, an electric motor 7 which supplies power for cocking the trap, a magazine support housing 1, a frame 2, and an electric motor 248 supplying power for the self angling mechanism. Frame 2, and housing 1, 3, and 4 are fixed together by any suitable fastening means so as to constitute in effect a single frame. Base 145 contains the angle changing mechanism and has mounted on it sub-base 144. Frame support 143 is rotatably mounted on sub-base 144 and supports the composite frame described above. Power is supplied by the continuously operating motor 7 to the cocking mechanism and the holding mechanism, releasing mechanism, and sprocket 142 of the indexing mechanism, which mechanisms are contained in gear housing 3. The target carrier or throwing arm 5 is mounted for rotation upon the upper end of a shaft 8 to which is imparted a rotational thrust for throwing the target by means of the mainspring 6 disposed protectively under the mainspring housing 4. A rotatable magazine assembly 257 is detachably mounted on housing 1 and through appropriate mechanism is indexed by power supplied through the rotation of shaft 8.

Figure 3:
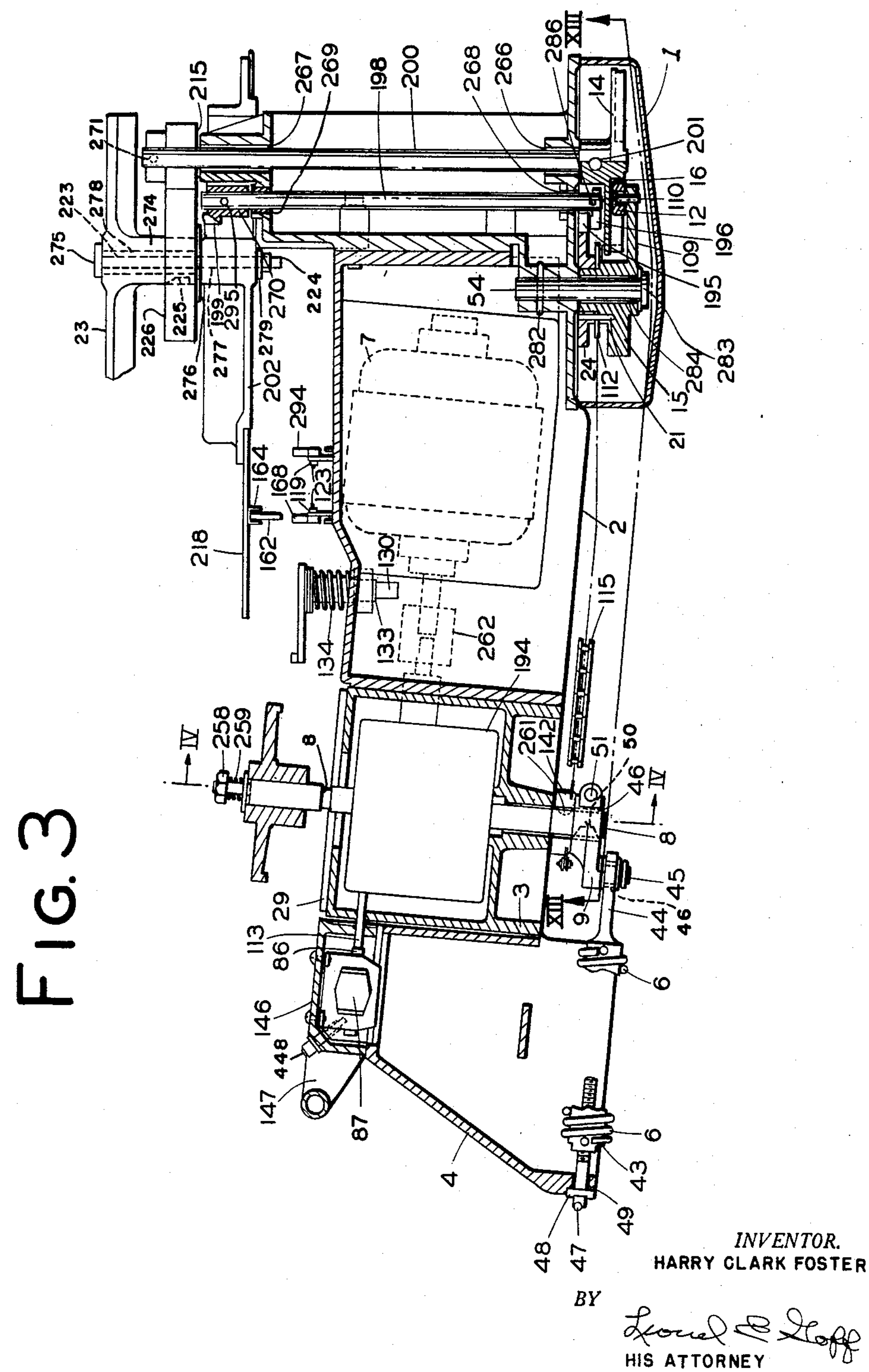
FIGURE 3 is a fragmentary cross-sectional view in elevation taken on line III—III of FIGURE 2.

The cocking, holding, releasing, target loading mechanisms, and the driver for the indexing mechanism are a compact unit, generally indicated as 24 in FIGURE 3, contained in and associated with gear housing 3. The motor continuously turns one gear of an epicyclic gear train in the gear housing 3 while the rest of the train may be set into operation to cock the throwing arm intermittently following each throwing operation. Upon actuation of the release mechanism the cocking mechanism is adapted to transmit power from the motor 7 through the entire gear train at a suitable speed reduction through the main shaft 8 to the mainspring 6 and through sprocket 142, mounted on the main shaft, by appropriate linkages to the rotary magazine. The gear train rotates the main shaft 8 to tension the mainspring 6 until the mainspring crank 9 attached to the lower end of shaft 8 is beyond the out dead center after which the shaft 8 and carrier arm 5 are turned ahead some further distance, without shock, to the cocked position whereupon the target carrier is held cocked and the gearing is again set to idle. The rotation of main shaft 8, in addition, during cocking rotates an escapement cam 194 by means of an appropriate linkage from sprocket 142 to release a target for transfer to a target feed shelf 126. As the target carrier proceeds to the cocked position, a target is then automatically fed to the carrier plate 33 ready for launching. The target is thrown when the release mechanism is actuated electrically from a remote position. In a travel of the throwing arm 5 from the cocked to the firing position the main shaft 8 traverses the same angle as the aforesaid arm thereby rotating sprocket 142 through a corresponding angle which activates by appropriate linking means the indexing mechanisms for the rotary target carrier.

In order that the elevation at which the targets are ejected may be controlled, there is provided an elevation adjustment screw 10 mounted rotatably but not slidably on housing 4 and passing threadedly through a swivel 11 pivotally carried by the upright 255 of frame support 143 and the other end of which is provided with a crank handle 13.

The second motor 248 mounted independently of the target throwing apparatus drives, by means of an appropiate gear train, a gear 170 at a constant rate. In accordance with this invention, a hub 172 is mounted eccentrically at the center of gear 170 and in turn, the hub, has mounted rotatably about it a second gear 177. Movement of gear 177 is controlled by means of an anchoring link 178 pivotally mounted to gear 177, which limits the movement of this second gear about the hub to an accelerating, decelerating, hesitating and reversing motion. This motion is transmitted to a ring gear 179 which by a second link 148 transmits this motion to the frame for the desired oscillation of the trap.

Main shaft 8 through sprockets 112 and 142, link chain 115 and a Geneva gear assembly, comprising an indexing arm 109, an indexing gear 14, transmit through drive shaft 200 and other appropriate gearing, an indexing rotary movement to the target carrier. This indexing movement imparts to the carrier, step by step, a rotary motion, bringing successive stacks of targets into register with feed shelf 126 to which a target is transferred by appropriate means. Mounted fixedly to the indexing member 15 and sprocket 112 is an escapement cam 194 with a protuberant surface 280 and a receding surface 281 operating a follower which controls the discharge of targets from the bottom of each successive stack when in register with the feed shelf 126.

The invention will be better understood from the following more detailed description with reference to the embodiment of the invention illustrated in the drawing.

Figure 9:
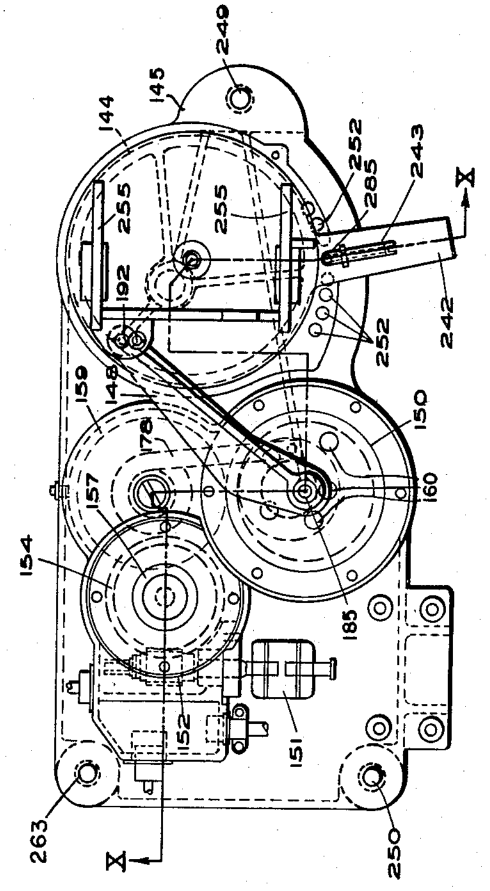
FIGURE 9 is a plan view of the base in the embodiment shown in FIGURE 1.
Figure 11:
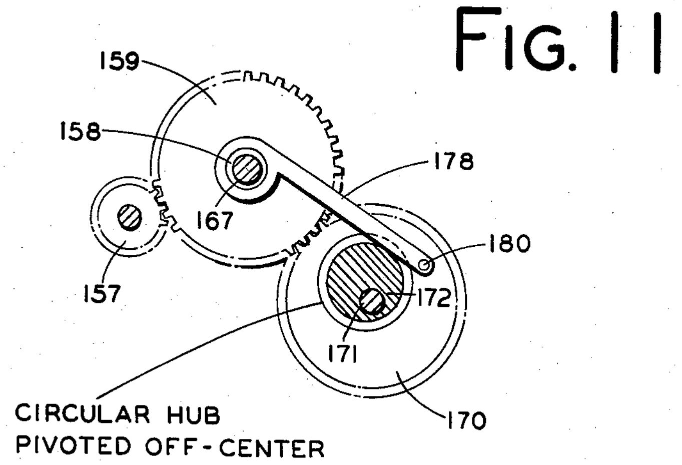
FIGURE 11 is a cross-sectional view taken along the line XI—XI of FIGURE 10.
Figure 12:
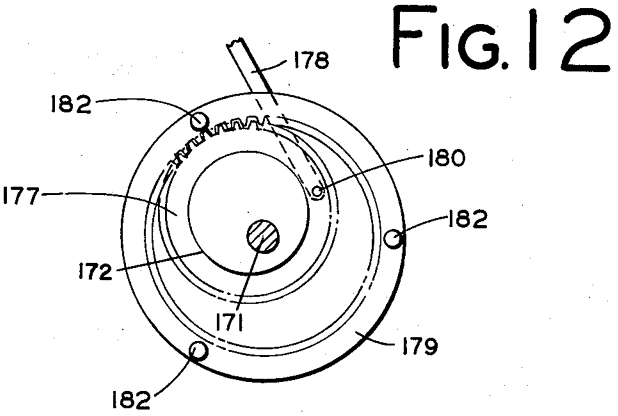
FIGURE 12 is a cross-sectional view taken along the lines XII—XII of FIGURE 10.

As is shown most clearly in FIGURES 1 and 9, the entire trap is mounted upon a base 145 which is provided with means such as holes 249, 250 and 263 for attaching the base to any suitable support, and upon which is pivotally mounted a sub-base 144. Fixed about the periphery of sub-base 144, and in base 145, are a series of windage adjustment holes 252 for correction of and fixing the target assembly against variation of wind direction and velocity. Extending from and integral with sub-base 144 is an adjustment arm 242 having mounted on it a bracket 251 and containing a hole 253 in circumferential alignment with holes 252. A plunger 285 with notch 245 and enlarged head 286 is placed in slideable relationship in hole 253 for engagement with holes 252. Head 286 serves as a base for spring 287 which forces and maintains a plunger head 286 into a hole 252. Pivotally mounted on bracket 251, by means of pin 244, is a release lever 243 having an end 246 in engagement within notch 245.

Pivotally mounted on sub-base 144 by means of a bearing assembly 254 is a swivel base 143 which is provided with upright supports 255.

The bearing assembly is constructed of multiple bearings 190 mounted within outer race 186 and an inner race sub-assembly consisting of elements 187, 188 and 189. Outer race 186 is fixed, by means of a plurality of screws 191, to swivel base 143. The inner race sub-assembly consists of a lower race 188 and an upper race 187 sandwiching between them, for appropriate adjustment of the assembly, a number of shims 189. This sub-assembly is fixed to sub-base 144 by bolts 256.

Mounted pivotally on upright supports 255 is the frame housing 2 by means of elevation pivot shaft 17 which passes through the upper part of the uprights 255. Frame 2 carries motor 7, the gear housing 3 and also the magazine support housing 1. Integral with the upper part of support housing 1 are magazine supports 216 into which is inserted suitable means such as pins 217 for attaching a magazine assembly 257. Attached to the front of the gear housing 3 is the mainspring housing or apron 4 which protectively covers and also provides a mount for one end of the mainspring 6 which provides the sudden thrust of throwing power needed to project a target in desirable fashion. The other end of the mainspring 6 is attached to the mainspring crank 9 which in turn imparts a rotational thrust to the main shaft 8 passing through the gear housing 3 and journaled at its lower end in the bottom of housing 3. The upper end of main shaft 8 is indirectly journaled through the hub 27 of feed cam 31 in the gear housing cover 29 from which the shaft protrudes sufficiently to carry the carrier or throwing arm 5 with its other components by means of a splined fitting 32 at the upper end of the shaft 8. The arm and cam are retained on shaft 8 by spring 258 and nut 259 by means of screw threads also at the upper end of shaft 8.

The target carrier or throwing arm 5 has a carrier plate 33 and a rubber or other resilient material faced rail 34. The arm 5 is formed with an upward tilt of about 5° as an extension of the circular hub portion 35 which is provided with an opening 37 internally splined at 36 for attachment to the splinned fitting 32 of the main shaft 8. At the outer end of arm 5 and supported underneath it is a carrier plate 33 which supports the target in its initial travel during the throwing operation from the moment of firing to the moment when the target leaves the arm. Although plate 33 in this embodiment is attached to arm 5, it is to be understood that plate 33 could be a separate stationary member mounted on frame 2 and of suitable arcuate length to support the target while it is propelled by the rail 34. In this embodiment described, the leading edge of the plate 33 adjacent shelf 126 in cocked position is formed with a projection 175 to prevent interference with the trailing edge of the target in throwing. Depending from the carrier arm 5 is the angularly adjustable rail 34, having attached to it by means of fasteners 260, the resilient leading edge 38, and which is pivotally attached at the inner end to arm 5 at the fastener 39 to extend outwardly above the carrier plate 33 at least to the slot 40. Angular control of the target trajectory and control of the levelness of the trajectory is attained by angular movement of the adjustable carrier rail 34 about pivot 39 to a desired position of the outer carrier rail support 41 as determined by the position of support fastener 42 in the arcuate slot 40 in the carrier plate 33. Slot 40 is of such length as to permit the rail 34 to be adjusted to an angle of lead or lag as necessary to correct for the effect of windage on levelness and direction. For example, a lagging rail causes a target discharge to the right with a tendency to a right tilt, whereas a leading rail causes a target discharge to the left with a tendency to a left tilt. To reduce the moment of inertia, the arm 5 is cast of a light metal such as a suitable magnesium alloy or the like and the light metal carrier plate 33, it will be noted from FIGURES 2 and 7 in particular, has a number of openings or cut out sections. It is to be noted that the rail 34 is adapted to be reversibly mounted to compensate for wear.

The main power for throwing the target with the sudden acceleration necessary is supplied at the lower end of the main shaft 8 by mainspring 6 the ends of which are threadedly secured to an adjustable internally threaded mainspring plug 43 at the front end and similarly to a second mainspring plug 44 at the rear for connection to the mainspring crank 9 as shown in FIGURE 3. The rear mainspring plug 44 is pivoted at one end to the crank 9 by means of mainspring crank stud 45 which is rotatable in crank stud bushing 46. The other or front mainspring plug 43 threadedly receives the T-headed mainspring adjusting screw 47 which in turn passes through mainspring swivel block 48 and through a slotted opening 49 in the frame 4. Screw 47 permits adjustment of the mainspring tension. The swivel block 48 permits lateral oscillation of the mainspring 6 without bending the spring. Mainspring 6 is a closely coiled spring. However, in order to permit a relatively heavy spring to be utilized in a longitudinally small space of length mainspring 6 may be a closely wound flat metal ribbon coiled edgewise.

Figure 4:
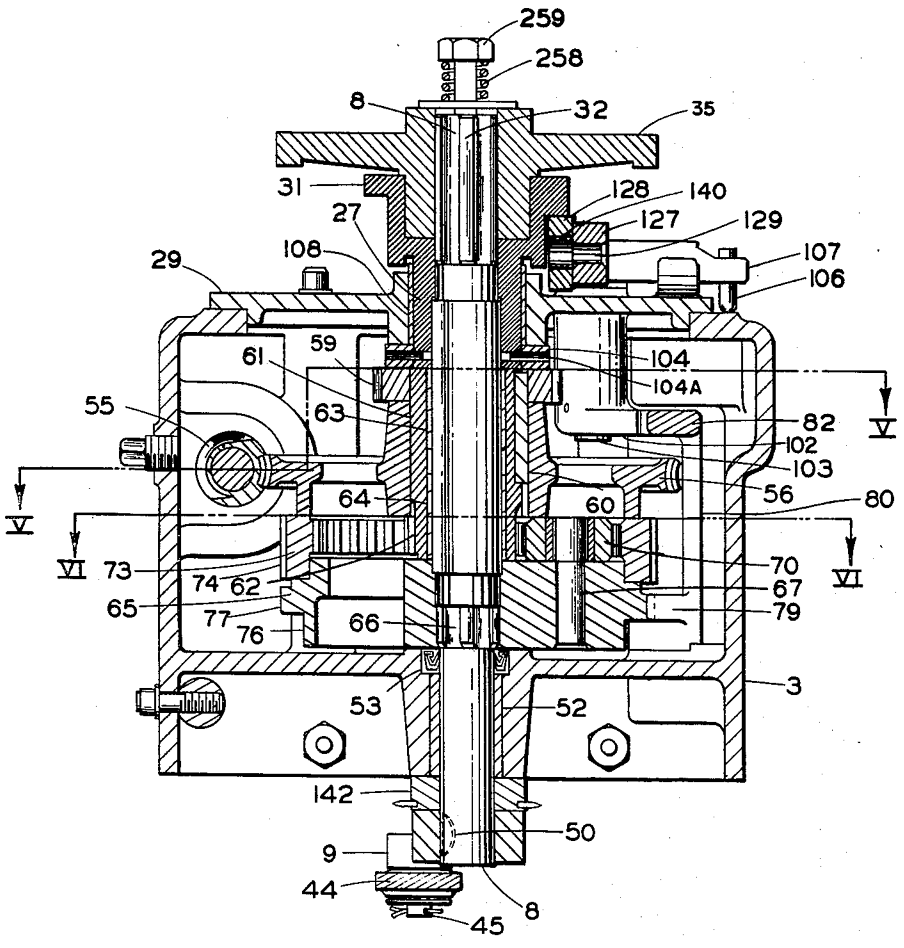
FIGURE 4 is a fragmentary cross-sectional view taken on line IV—IV of FIGURE 3 illustrating certain details of the holding, cocking, transmission and release mechanism involved.

The mainspring crank 9 is fixedly attached at its hub to the lower end of the main shaft 8 by means of a key 50 and a clamp screw 51. The main shaft 8, as is shown in FIGURE 4, extends through the bottom of the gear housing 3 and is there rotatably supported in a main shaft lower bearing 52. Also fixedly mounted by means of key 261 at the lower end of main shaft 8 and disposed above crank 9 and below bearing 52 is a sprocket 142 whose function will be described hereinafter.

Mounted in the bottom of the gear housing 3 above this bushing there is a main shaft oil seal 53 disposed between the main shaft 8 and the housing 3 to prevent loss of the oil bath contained in the housing. Upon expenditure of the throwing power stored up in the spring 6 at the conclusion of a target throwing operation, cocking power is automatically channeled from the continuously operating motor 7 through the flexible coupling 262 (FIGURES 3 and 13) and the worm drive shaft 55 to the epicyclic gear train in gear housing 3 by way of the worm gear wheel 56 (FIGURE 5).

Figure 5:
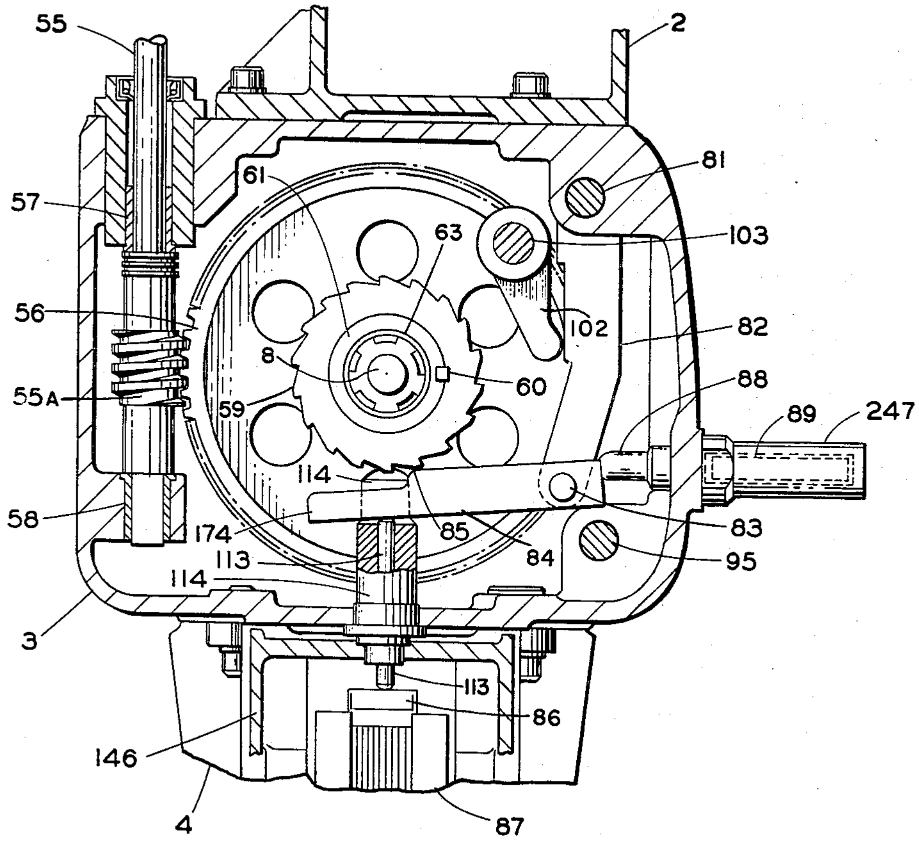
FIGURE 5 is a fragmentary cross-sectional view taken along the lines V—V of FIGURE 4.

In the gear housing 3, worm drive shaft 55 having a worm 55A of sufficiently steep lead to avoid self-locking, is journaled in worm shaft bushings 57 and 58 (FIGURE 5). The worm gear wheel 56 and also the firing ratchet 59 are mounted fixedly by means of key 60 on the hub 61 of the sun gear 62. The hub 61 in turn is rotatably mounted by means of sun gear bushings 63 and 64 on the main shaft 8. Also located in housing 3 is the control cam 65 fixedly mounted by means of the lower splined fitting 66 on the rotatable main shaft 8. Carried on the control cam 65 are the planet studs 67, 68 and 69. Mounted rotatably on a shoulder of the control cam 65 is the internal ring gear 73 with the external ratchet 74. The planet gears 70, 71 and 72 are also in engagement with the sun gear 62 and the ring gear 73. Control cam 65 is provided at its lower end with a cam surface having a protuberant control portion cam surface 75 and a recessed control cam surface 76 generated by a shorter radius than that which generates the protuberant portion 75.

Control cam 65 also has a rim portion 77 in which is formed a holding notch 78 designed for coaction with a sear 79 formed on the lower portion of the sear member 80 which is rotatably carried by shaft 81 journaled in gear housing 3. The upper end of the sear member 80 is provided with an operating arm 82 linked by means of the firing bar stud 83 to one end of firing bar 84 adjacent to the other end of which, resting in slotted end of guide 114, there is provided a firing pawl shoulder or abutment 85 and a control extension 174. This end of the firing bar is adapted to be acted upon by the firing pin 113 slidably carried in firing pin guide 114 mounted on housing 3 under the impetus of plunger 86 of the release solenoid 87 so as to force pawl shoulder 85 into the teeth of the ratchet wheel 59. Extension 174 is a surface limiting the engagement of the shoulder 85 with wheel 59 and thus determines the extent of movement of bar 84. Pressing against the other end of firing bar 84 adjacent the stud 83 and tending to turn the bar 84 about stud 83 counter-clockwise (FIGURE 5) against plunger 86, is the sear plunger 88 which is yieldably mounted against the sear spring 89 carried in an extension of the housing 3 known as a sear plunger bushing 247. Sear plunger 88 also functions through firing bar stud 83 to turn operating lever 82 clockwise so as to urge sear 79 into notch 78.

In order to reduce the weight and moment of inertia of the parts of the trap which turn in unison during the throwing operation so as to obtain the highest proportion of target throwing spring power, it will be noted (FIGURE 4) that the control cam 65 is almost entirely hollowed out except for three radial ribs each of which carries one of the planetary gears and connects the rim and cam portions of cam 65 to its hub portion. To further reduce its weight, the cam 65 may consist of a suitable light metal or alloy.

Also mounted in housing 3 is a cocking pawl 91 the hub 92 of which is pivotally mounted on the eccentric hub 93 of the hold back pawl 94 which in turn is pivotally mounted on and carried by the shaft 95. The upper end of the cocking pawl 91 is provided with a tooth 96 for engagement with the teeth or serrations of the external ratchet 74 carried on the ring gear 73.

Figure 6:
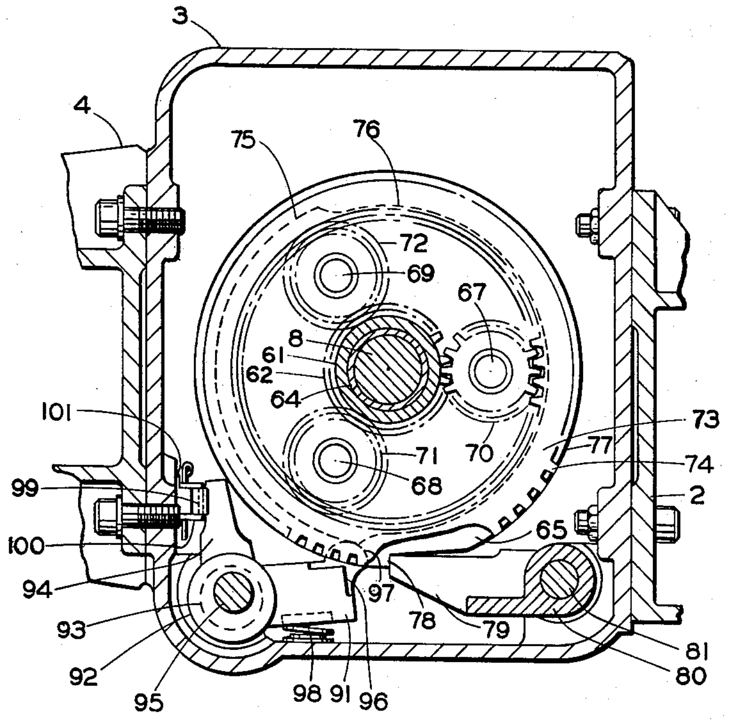
FIGURE 6 is a fragmentary cross-sectional view taken along line VI—VI of FIGURE 4.

When the tooth 96 of pawl 91 engages with the ratchet 74, the force of ring gear 73 on the cocking pawl 91 acting through the eccentric hub turns the hold back pawl 94 clockwise into engagement with the ratchet 74 (FIGURE 6). The lower end of cocking pawl 91 carries a follower 97 for engagement with the cam surfaces 75 and 76 of the control cam 65. One side of the end of hold back pawl 94 is also adaptable for engagement with the teeth or serrations of the ratchet 74 of the ring gear 73. Bearing against the back side of the cocking pawl is the cocking pawl spring 98, acting to thrust the cocking pawl 91 away from the wall of the gear housing into or toward both the ring gear 73 and control cam 65. The other side of the end of hold back pawl 94 is formed to act as an armature seating against a pawl holding permanent magnet 99, which is mounted on a non-magnetic member 101 carried by and extending into housing 3. Magnet 99 is fastened to member 101 by means of a U-shaped strap 100 having limited pivotal movement to aid both poles of magnet 99 to seat on pawl 94. However, the magnet may be rigidly mounted. The structure of the cocking pawl 91 and the hold back pawl 94 is such that in cooperation with the gearing these members prevent undesired acceleration and the shock movement which would result after the mainspring crank stud 45 has passed the out dead center at the conclusion of the cocking operation.

To permit manual operation of the trap for testing or the like, gear housing 3 also contains a trigger dog 102 pivotally mounted by means of trigger arm shaft 103 on gear housing cover 29 and adapted to be turned against the operating arm 82 of the sear member 80 (FIGURE 5), when the handle of the trigger 105 is pulled up (FIGURE 1). Trigger 105 mounted pivotally outside frame 1 acting through the trigger pull rod 106 and the trigger arm 107 is disposed above gear housing cover 29 and is attached to the upper end of trigger arm shaft 103 to the lower end of which dog 102 is attached and causes the dog 102 to turn counter-clockwise (FIGURE 5) to press against operating arm 82 turning the sear member 80 and its sear 79 counter-clockwise so as to lift sear 79 out of the notch 78 in the rim of control cam 65 (FIGURE 6).

Suitably secured on gear housing 3 is a cover 29 in which hub 27 of target feed cam 31, mounted on main shaft 8, is rotatably mounted by means of an upper main bearing 108 (FIGURE 4). Separation of cover 29 and cam 31 is prevented by a feed cam collar 104 secured on the end of the hub 27 of cam 31 by means of feed cam collar pins 104A. Target feed cam 31 has a well for receiving the hub 35 of carrier arm 5 so as to permit a greater degree of engagement between arm 5 and main shaft 8 at the splined fitting 32.

Fixedly secured against rotation by means of pin 282 in the lower and forward part of magazine support housing 1 is a shaft 54 having formed at its lower end a head 283. Rotatably mounted on shaft 54 by means of bushing 284 are escapement cam 194, sprocket 112 and indexing disc 15. Cam 194, sprocket 112 and disc 15 are fixedly assembled to each other by means of pins 21 so that they rotate as a unit about shaft 54. Escapement cam 194 is provided about its periphery with a cam surface having a protuberant control portion 280 and a recessed clearance surface 281 generated by a shorter radius than that which generates the protuberant portion 280. The protuberant portion 280 of escapement cam 194 extends through an angle of about 70° and the receding portion traverses an angle of 250°.

Disc 15 has a concentric lateral surface 20 extending through an arc of about 270° and of a radius to have a sliding fit within the locking surface 18 of indexing gear 14 described below. The disc has through an arc of 90° a concave clearance 28 which is formed on a radius to permit free movement of the indexing gear 14 through said clearance 28. Extending from and integral with this disc 15 is an arm 109 having mounted on its end by means of pin 110 an indexing drive roll 12. The diameter of roller 12 is such as will permit its engagement within slots 16.

Extending through the magazine support housing 1 is an escapement shaft 198 rotatably supported by bushing 268 and 269. Fixedly mounted at the upper end of shaft 198 by means of pin 295 is an escapement lever 270 from which extends an arm 199. Fixedly mounted on the lower end of shaft 198 is the escapement driver arm 196 having mounted on its free end by means of pin 197 an escapement follower 195 which rides in engagement on control surfaces 280 and 281 of cam 194.

An indexing shaft 200 extends through the rear of magazine support housing 1 and is mounted thereon at its lower end by means of bushing 266 and at its upper end by means of bushing 267. Fixedly mounted on the upper end of shaft 200, by means of pin 271, is a gear 215. Fixedly mounted on the lower end of shaft 200, by means of pin 201, is an indexing gear 14. Gear 14 has four equally spaced driving slots 16 and intermediate equally spaced locking surfaces 18.

Power to operate the aforedescribed driving disc 15, escapement cam 194, and driving gear 14 is transmitted to sprocket 112 by means of a linking drive chain 115 connecting said sprocket to sprocket 142 mounted about main shaft 8.

Mounted above magazine support housing 1 and in supports 216, by means of support pins 217, is a magazine assembly hereinafter described. The magazine assembly consists of a circular base 202 containing a network of raised reinforcing members 207, 207A, 208, 210, and 228 variously extending from hubs 227, 229, 227A, 287 and pad 211. Base 202 has mounted to it and extending from it by means of fasteners 265 an annular ring portion 218 completing the base structure. Rib 228 defines an area which encompasses escapement lever 270 and hub 220. Annular ring 218 contains an aperture 219 which defines the opening for a target from a plurality of stacks supported above the base. Slidably mounted in basses 205 and 206 is an escapement rod 203 of which one end abuts escapement arm 199 against which it is held by means of spring 214 acting on the other end. Spring 214 is fixedly mounted on base 202 by means of a holder assembly. Spring holder assembly consists of pad 211 and plate 212 which sandwich fixedly between them the spring 214 by means of bolts 213.

Pivotally mounted at 232 by means of a pin 234 on magazine spider 23 about and above opening 219, is shown a target escapement assembly 235 having three protruding arms 236, 237 and 238. Pivotally mounted at the end of arm 238 by means of screw 233 is a resilient cushion 241 for engagement with either the bottom or second to bottom target during the operation of the trap. Holding the resilient cushion 241 for engagement with the targets is a spring 271 mounted at one end by means of hole 272 to arm 237 and at its other end to magazine outer guide rail 230.

Suspended below annular plate 218 is a single bracket 164 having mounted within it by means of pin 163 a target feed finger 162 which is yieldably held in position by gravity.

Rotatably mounted about the magazine base is a magazine spider 23 mounted on stud 223 having a headed end 275 and which itself passes through bushing 278, and has a shoulder portion resting on thrust washer 276 and a reduced body portion 277 which mounts the spider rotatable to base 202, to which it is secured by means of lock washer 279 and nut 224. The interior structure of magazine spider 23 contains a hub 274 about which is mounted fixedly by means of key 225 a gear 226 which meshes with gear 215 mounted on magazine drive shaft 200. The ratio of gear 226 to gear 215 is such as will bring each of the stacks of targets, mounted in the magazine successively in register with opening 219 in the base of the magazine. In the instant embodiment wherein 10 stacks of targets are employed this ratio is 2.5:1. Mounted on spider 23 are guide rails 230 and 231. These three guide rails define the magazine space for holding a stack of nested targets. At the lower end, rails 230 extend below the lower end of rail 231 to below annular ring 218. The lower end of guide rail 231 extends to just above escapement cushion 241 to permit free movement of the resilient cushion mounted on arm 238 of assembly 235 and serves as a stop limiting clockwise rotation of escapement assembly 235.

Mounted on the feed shelf operating bracket 125 below the magazine is a target feed shelf 126 which coacts with the target feed arm 127 one end of which is pivoted on the gear housing cover 29 and carries rotatably intermediate the ends of arm 127 a feed cam roll 128 mounted on arm 127 by means of stud 129 and bushing 140 (FIGURE 4) which follows the profile of the target feed cam 31 and thereby controls the operation of the target feed shelf by means of feed shelf roll 161. Depending from and attached to bracket 125 are a pair of spaced feed shelf guide rods 130 and 131 which slidably engage with feed shelf guide bushings 132 and 133 which are mounted on and protrude from the upper surface of frame 2 at the feed shelf. Disposed about each bushing and guide rod is a feed shelf lifting spring such as springs 134 and 135 mounted in compression between bracket 125 and frame 2. Accurate positioning of the feed shelf 126 is obtained by interposition of feed shelf shims 136 between the shelf 126 and the bracket 125. It is evident that the feed shelf 126 is raised by feed shelf lifting springs 134 and 135 and is lowered by target feed cam 31 in timed relationship with the rotation of carrier arm 5.

Figures 7, 17, 18:
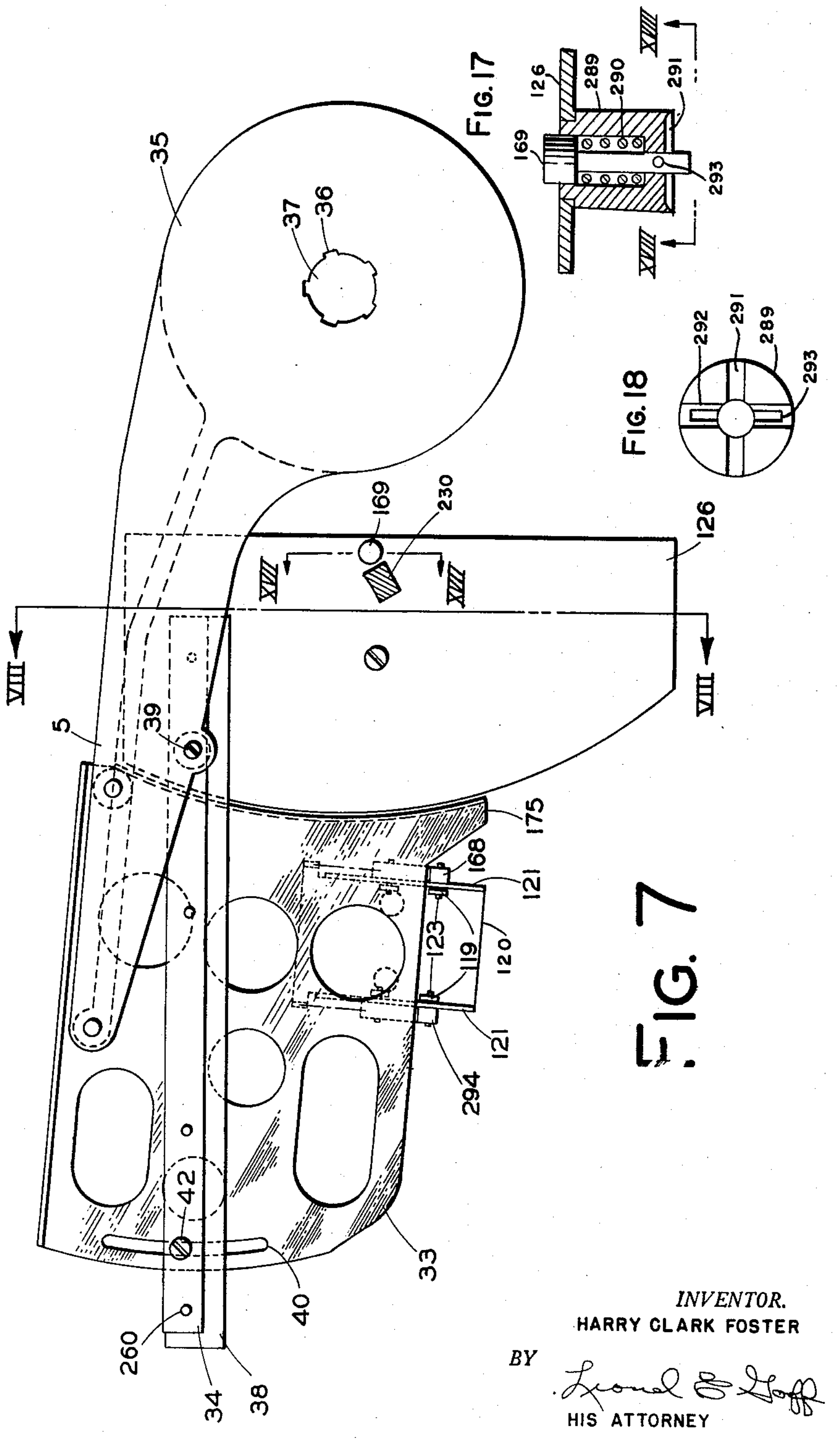
FIGURE 7 is a partial plan view of the throwing arm in the cocked position in the embodiment shown in FIGURE 1 in cocked relation to the target feed shelf.
FIGURE 17 is a partial side view on line XVII—XVII of FIGURE 7.
FIGURE 18 is a partial bottom view on line XVIII—XVIII of FIGURE 17.

Depending and protruding below feed shelf 126 is a guide 289 into which is mounted a target guide button 169. Guide 289 has at its lower end a slot 292 and a groove 291. Fixedly attached to the lower end of button 169 and perpendicular to its cylindrical axis is a cross-member 293 which in normal use is engaged in slot 292. Disposed about button 169 is a lifting spring 290 which maintains cross-member 293 in slot 292 and forces button 169 to protrude above feed shelf 126 (FIGURES 17 and 18). In the use of the trap for doubles, button 169 is pushed in against spring 290 until cross-member 293 is below guide 289 and out of engagement with slot 292; the button is then rotated until cross-member 293 is in alignment with groove 291, wherein the cross-member is engaged upon release of button 169. In this position the top surface of the button is flush, or slightly below, the face of shelf 126 to permit the inner target, of doubles, to ride across the shelf without hinderance.

Figure 13:
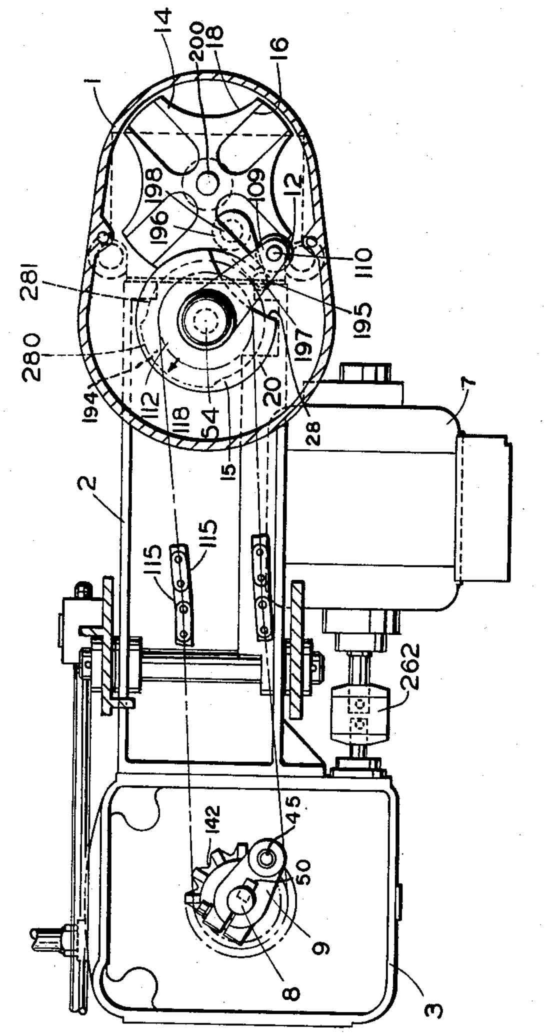
FIGURE 13 is a cross-sectional bottom view taken along lines XIII—XIII of FIGURE 3.
Figure 14:
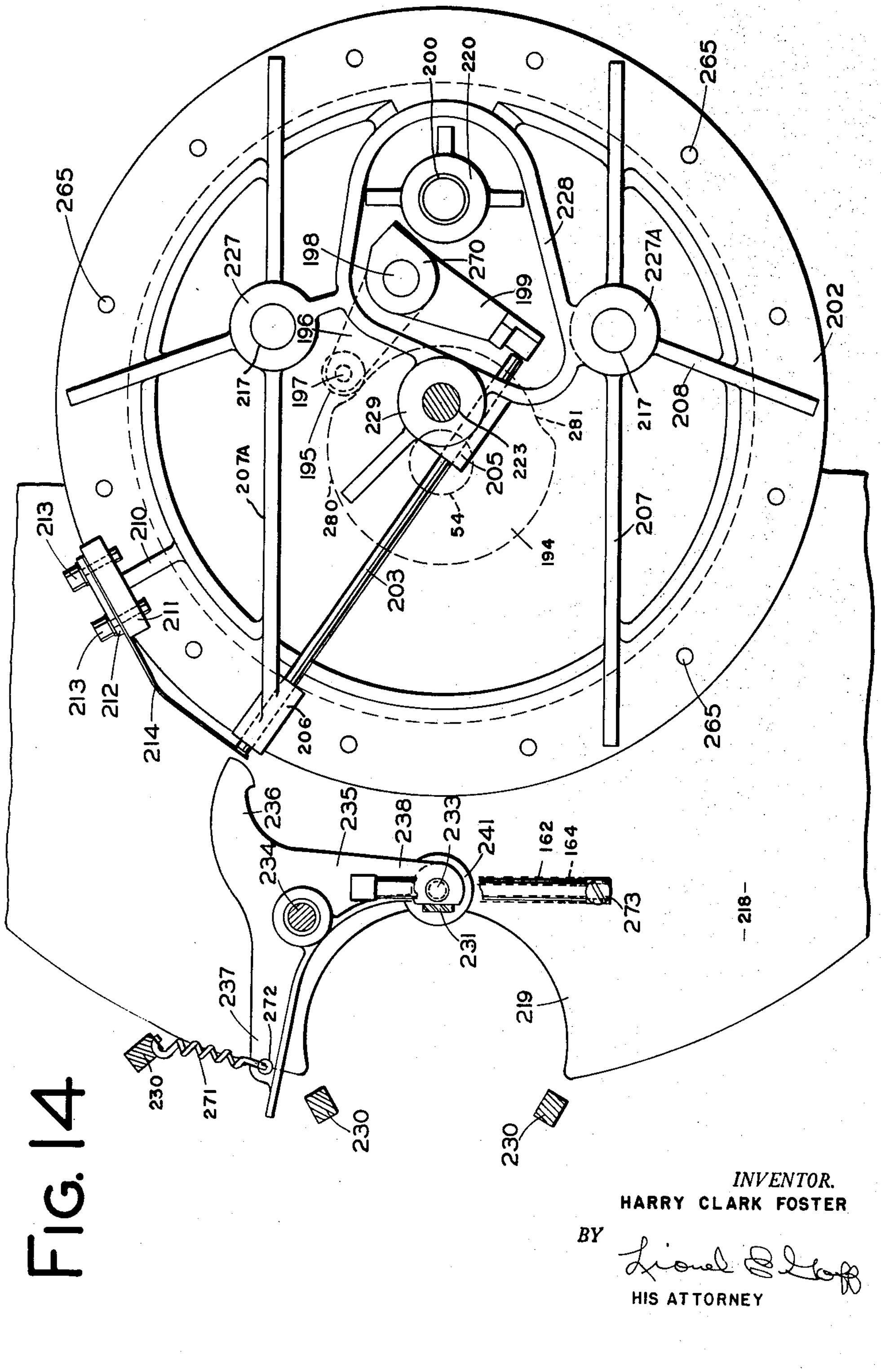
FIGURE 14 is a cross-sectional view of the release mechanism of the magazine taken along line XIV—XIV depicted in the embodiment shown in FIGURE 1.

The alignment and timing of the indexing mechanism to the target feeding and target throwing mechanism is accomplished when the trap is in the cocked position. With reference to FIGURE 13, when the trap is cocked, the arm of crank 9 is 30° below its center and to the right. At this position of the crank indexing gear 14 is rotated until the center lines of slots 16 are at about a 45° angle as shown in FIGURE 13. The indexing disc is then rotated until the center of roller 12 is below a horizontal line through its center and to the right in about the same general direction as the arm of crank 9. At this position of the aforesaid elements, an indexing link chain 115 is mounted on and about sprockets 142 and 112 which are of equal diameter. As can be clearly seen, each complete revolution of shaft 8 drives indexing disc 15 through a complete revolution, however driving indexing gear 14 through only 90° or one-fourth revolution.

It is pointed out that when the trap is in the cocked position, roller 195 rides on the receding portion 281 of escapement cam 194. During the rotation of throwing arm 5, main shaft 8, and sprocket 142, link chain 115 causes indexing disc 15 to rotate. During 270 degrees of angular movement from the cocked position of the trap the surface 20 of disc 15 slides within concave surface 18 of the Geneva indexing gear 14, however it is to be noted that after about 225° of angular travel, notch 28 of disc 15 just begins to come opposite index gear 14. After 270 degrees of angular travel drive roller 12 of index disc arm 109 begins its entry into a slot 16 of index gear 14. On continued angular travel drive roller 12 forces the slotted ends of gear 14 to rotate within the opening for said slots formed by the passage of notch 28 in rotation of disc 15. On completion of 360° angular path of roller 12, the indexing gear has been given a rotation of 90°, again bringing a concave surface 18 of gear 14 into sliding engagement with surface 20 of disc 15 thereby locking gear 14 against further rotation. This 90° of rotation of gear 14 occurs for each complete revolution of disc 15, and accordingly for each complete revolution of main shaft 8.

This 90° of rotation of gear 14 is transmitted by appropriate gearing, described above, to impart, and accordingly index, an angular rotation of 36° to magazine 257 carrying ten stacks of targets. As noted above this is accomplished by use of a gear ratio of 2.5 to 1 in the selection of gears 215 and 226. Accordingly each complete revolution of main shaft 8, by the above described gear train, brings successive stacks of targets into register for delivery of targets to the feed shelf 126 and carrier 33.

Release of the targets from the bottom of the stacks in the rotary magazine to shelf 126 is controlled by the escapement mechanism which comprises essentially escapement assembly 235, rod 203, escapement levers 270 and 196, and escapement cam 194.

Escapement lever 270 is mounted on escapement shaft 198 at about 90° to escapement drive 196 with respect to the point of contact of arm 199 with escapement rod 203, and to follower 195. When follower 195 rides on receding portion 281 of escapement cam 194 escapement lever 270 is in a retracted position. Follower 195 is held against receding portion 281 through the force submitted by the action of escapement spring 214 against rod 203 and in turn against arm 199. Since no force is exerted against arm 236 of escapement lever 235, the resilient escapement cushion 241 is held against the periphery of the bottom target by spring 271, against guides 230 with sufficient force to support a stack of targets above the bottom one. This bottom target and all the targets above it are thus secured against dropping. When follower 195 rides on the protuberant portion 280 of target escapement cam 194 a clockwise force is submitted through 198 and escapement lever 270 against escapement rod 203 and in turn against arm 236 of target escapement assembly 235. This applied force on arm 236 pivots escapement assembly 235 against the force of spring 271 to bring the resilient cushion out of contact with the bottom target in the stack thereby permitting it to drop upon the feed shelf 126 which supports the stack of targets during the period of time follower 195 rides on protuberant portion 280 of cam 194. As the receding portion 281 rotates opposite follower 195, cushion 241 closes on the second from bottom target, at a time prior to lowering of the feed shelf 126 to deliver the bottom target to carrier 33.

Mounted on base 145 is an angle changing motor 248 which submits by means of a flexible coupling 151 rotation to angle changing worm 152. Meshing with worm 152 is an angle changing worm gear 154 fixedly mounted by means of key 155 on the upper portion of a rotatable shaft 153. Fixedly mounted on lower end of shaft 153 by means of key 156 is angle changing pinion 157 which turns as a unit with worm gear 154. Mounted adjacent worm 152, worm gear 154, shaft 153 and pinion 157 are a series of lubricant wicks 479 which serve to carry lubricant to the worm gearing. Shaft 153 is rotatably mounted by means of appropriate bushings into the bottom of base 145 and into a cover plate 319 which is fixed by means of screws to the top of base 145. An angle changing idle gear 159 with hub 167 meshes with pinion 157 and is rotatably mounted about pin 158. A control hub gear 170 is rotatably mounted about a shaft 171 which in turn is mounted in the bottom of base 145. Gear 170 meshes with idle gear 159 and has eccentrically and fixedly mounted on it by means of pin 176 a hub 172. Hub 172 has formed on its upper portion a small shoulder to support an angle changing control gear 177 which is concentrically and rotatably mounted about the upper portion of the hub 172. Meshing with control gear 177 and concentrically mounted with drive gear 170 is an angle changing ring gear 179 which is fixedly mounted by means of pins 182 to an angle changing disc driver 181 which in turn is fixedly mounted by means of key 183 to shaft 171 and hub of angle changing disc 150. A cover plate 184 containing an opening for disc driver 181 is mounted by means of appropriate fasteners to the top of base 145. The top surface of cover plate 184 is substantially flush with the top surface of disc driver 181.

The angle changing disc 150 containing a plurality of holes 160 in its top surface at varied distances from its center is mounted on shaft 171 and is provided with a hub 320 which is rigidly attached by means of key 183 to the disc driver 181. Mounted in one of the holes 160 by means of spread adjusting screw 185 is one end of an angle changing link 148 connected at its other end by means of pin 192 to swivel base 143. The trap is forced to move through the desired arc by the angle changing link 148 connected at one end to swivel base 143 and at its other end to the spread adjusting screw 185 mounted in one of the holes, in the instant embodiment one of six holes, in the angle changing disc 150. The spread or magnitude of oscillation is controlled by the crank radius of the particular hole in disc 150 in which spread adjusting screw 185 is mounted.

In order to prevent the shooters from guessing the direction of succeeding target launchings the trap is oscillated over the prescribed arc in a repetitive non-uniform, non-rhythmic, non-cyclic manner by a hesitant progressively counter-clockwise rotation of the angle changing disc 150. This motion of disc 150 is obtained by the above described gearing through their functions which follows.

The angle changing motor 248 drives the control hub gear 170 at a constant counter-clockwise reduced speed through the means of an angle changing worm 152, angle changing worm gear 154, angle changing pinion 157 and angle changing idle gear 159. The angle changing control hub 172 is mounted eccentrically upon, and driven by, the control hub drive gear 170. The angle changing control gear 177 is journaled upon the eccentric portion of the control hub and constrained to a combined oscillatory and gyratory motion by the angle changing control link 178 which has an upstanding control link stud 180 engaging a hole in the rim of control gear 177 while its other end is pivotally anchored to hub 167 of idle gear 159. The control gear 177 is in constant mesh with the internal teeth of angle changing ring gear 179 which turns as a unit with, and drives, the angle changing disc driver 181 and the angle changing disc 150.

In the instant embodiment, control hub 172 is eccentrically formed about a concentric portion 321 about which is mounted control hub drive gear 170. Although this specific embodiment is illustrated it is obvious that hub portion 321 is not required. As noted above drive gear 170 may be rotatably mounted on shaft 171 and control hub 172 also rotatably mounted on shaft 171 and resting on drive gear 170 or the eccentric hub 172 may be formed integrally with the gear 170.

The conversion of the constant speed of rotation of the angle changing control hub 172 and its drive gear 170 to non-uniform rotation of the angle changing disc 150 may be explained as follows:

First assume that, instead of attaching link 178 to gear 177 at point 180 in rim of gear 177, the attachment point 180 is moved to the end of an infinitely long arm rigidly attached to the gear 177. With such an arrangement the control gear would be constrained to gyrate, but not oscillate, as the drive gear 170 and its eccentric hub 172 are rotated; the ring gear would be driven at a like constant velocity but at a reduced speed. As the imaginary arm on control gear 177 is made progressively shorter the gyratory motion of said control gear is modified by a superimposed oscillatory motion which in turn is transmitted proportionately to the ring gear 179 causing periodic acceleration, deceleration, hesitation and reversal in the rotary motion of the latter.

With the extremely short imaginary arm achieved by the connection of control link stud 180 in the rim of gear 177 the magnitude of oscillation imparted to gear 177 is such that it rapidly advances or retards the output motion of ring gear 179 and angle changing disc 150 at various points in the cycle depending upon the ratio of gears and proportions of the links.

Figure 16:
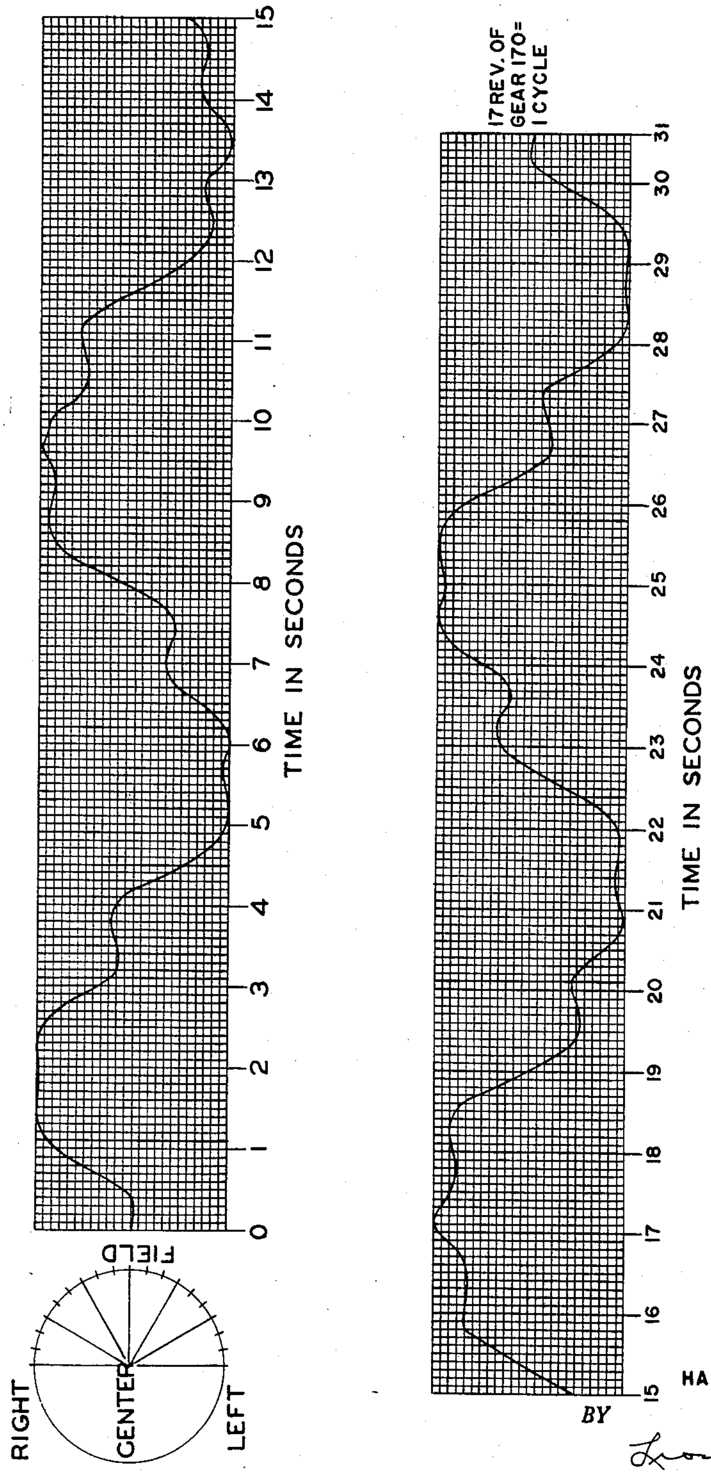
FIGURE 16 is a time and motion diagram showing the distribution of targets, by the angle changing mechanism across the shooting field with respect to time interval.

The ratios and proportions in the instant embodiment were chosen to provide a motion which in conjunction with the various rates of shooting ranging from slow to extra fast would result in a mixing of target discharge angles which would be difficult for the shooters to predict. The specific selection of ratios and proportions will be hereinafter described together with FIGURE 16 illustrating the results of the above non-uniform motion.

In association with the electrical system which provides both power and control for the trap and which includes the motor 7, there is a release solenoid 87 having a plunger 86 for pushing firing pin 113 slidably carried in the firing pin guide 114 mounted in gear housing 3 to initiate the throwing operation. Solenoid 87 is mounted by suitable fasteners under a solenoid housing 146 provided for convenience with a hand grip 147; and housing 146 in turn is mounted by means of screws 448 and 149 to mainspring housing 4 so as to become in effect a part of frame 2.

Figure 15:
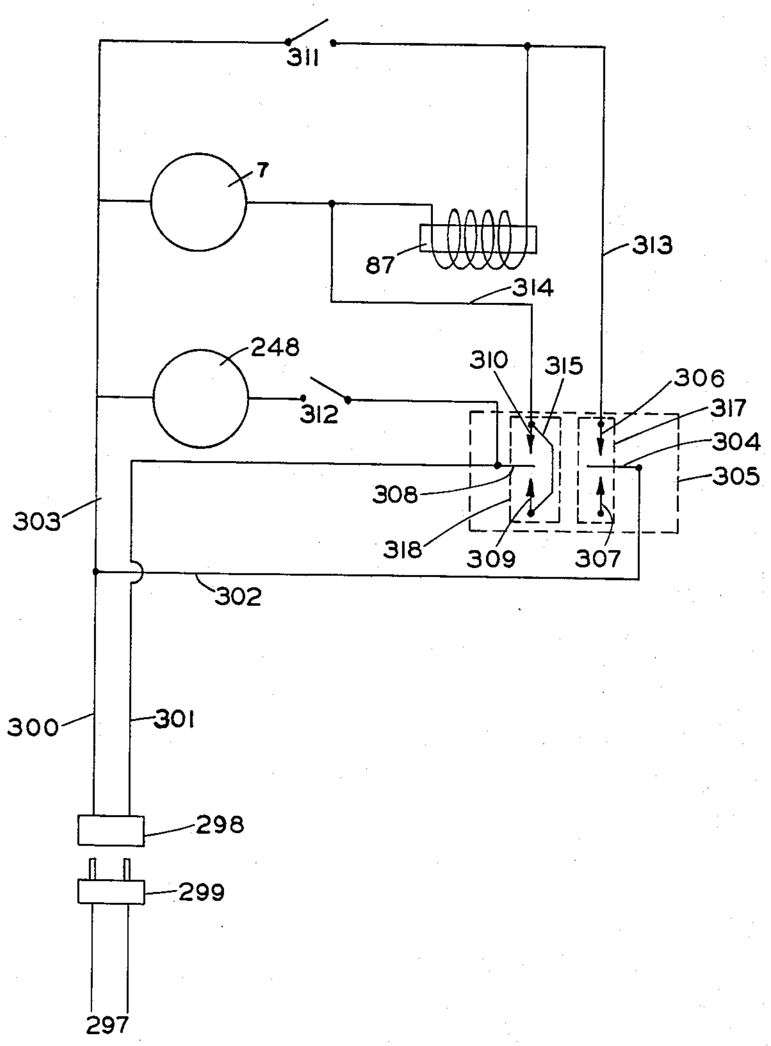
FIGURE 15 is a diagrammatic view of the electric power and control system employed with the embodiment illustrated in FIGURE 1.

The electrical wiring system of the trap may be described best with reference to FIGURE 15 wherein power is supplied to lines 300 and 301 by means of receptacle 298 and plug 299 from a power source 297. Power line 300 divides into lines 303 and 302 which latter is connected to the middle pole 304 of the switch unit 317 contained in switch assembly 305. Power line 301 is connected to the middle pole 308 of another switch unit 318 also contained in switch assembly 305 and the line 301 is also connected to one pole of switch 312. The other side of switch 312 is connected with one side of angling motor 248.

Switch unit 317 is a three pole unit containing poles 304, 306 and 307. The unit is so designed that it may be locked or set to stay in contact with pole 307 or in the neutral position, however, requiring a continued and applied pressure to maintain it against contact 306 which is connected to line 313 which is connected to one side of solenoid 87 and to one pole of switch 311. Switch 318 is similarly constructed to function in like manner as unit 317. However, unit 318 has a shunt 315 shorting contacts 309 and 310. Contact 307 of unit 317, on the other hand, is unconnected to or from any source.

A line 314 connected at pole 310 leads and connects to the other side of solenoid 87 and into one side of trap motor 7. In practice, switch units 317 and 318 are so arranged that they are operated as a unit in closing poles 308 and 304 respectively against contacts 310 and 306.

Switch 312 may if desired be also contained in switch assembly 305 and the various wires leading from assembly 305 may be contained in a single insulating cable extending from the switch assembly. Line 303 leads from its juncture with line 300 to the other side of angling motor 248, to the outer side of trap motor 7 and to the other side of switch 311. The operation of angling motor 248 is controlled by opening or closing switch 312. In operation poles 308 and 304 are switched into contact respectively with contacts 309 and 307. This position of the switch units completes the circuit to trap motor 7 which is set into operation. Contact 309 also connects one side of solenoid 87 to power line 301. The circuit to solenoid 87 is completed by closing switch 311. It is to be noted that the operation of self angling motor 248 is independent of trap motor 7 and solenoid 87. Trap motor 7 and solenoid 87 are deactivated by opening switch units 317 and 318. These switch units provide a safety feature in that by momentarily switching poles 308 and 304 against contacts 310 and 306, solenoid 87 and motor 7 are momentarily activated to release the restraining means holding the throwing arm to release and discharge any target contained thereon, and to relieve the arm in the firing position upon release of the switch to return to neutral.

With the trap in cocked position with a target emplaced upon the carrier arm plate 33 from the stack 316 in the magazine, the target is thrown by momentarily closing the electric contacts of the release switch 311 (FIGURE 15), whereupon release solenoid 87 is energized and its plunger 86 pushes firing pin 113 against the end of firing bar 84 causing firing pawl shoulder or tooth 85 to engage with and be moved to the right by ratchet wheel 59 which is continuously turned counter-clockwise (FIGURE 5). Thus moved, firing bar 84, acting through firing bar stud 83, exerts a force on the end of operating arm or lever 82 of the sear member 80 which as a result is turned to lift the sear 79 out of notch 78 formed in the rim 77 of control cam 65 (FIGURES 4, 5 and 6). This releases the control cam 65, main shaft 8, target feed cam 31, throwing arm 5 and target escapement cam 194, through sprockets 142 and 112 and link chain 115, to turn counter-clockwise in unison leaving arm 5 free to throw the target from the carrier plate 33 under the impetus of tensioned mainspring 6 acting from a point at which main spring crank stud 45 is about 30° following out dead center. During the first part of the target throwing or firing operation, the follower 97 of the cocking pawl 91 rides the protuberant portion 75 of cam 65 holding the cocking pawl tooth 96 from clattering along the teeth of ratchet 74 of ring gear 73 which during firing also turns counter-clockwise in the same direction as arm 5, main shaft 8, and continuously turning sun gear 62 inasmuch as the control cam 65 carrying the planetary gears 70, 71 and 72 is turning with main shaft 8 far more rapidly under the impetus of mainspring 6 than the rate at which the planetary gears are caused to turn about planet gear studs 67, 68 and 69 under the impetus of the sun gear 62 driven by the motor 7.

At the beginning and for about the first 60° of the throwing operation target feed cam 31, acting through feed cam roll 128, target feed arm 127, and feed bracket or shelf operating roller 161, holds the target feed shelf 126 at the lower end of its travel at which shelf 126 is in line with the carrier plate 33 of rotating arm 5. At about 60° of the turning cycle of the arm measured from the cocked position, feed cam 31 begins to permit elevation of the feed shelf 126 which at about 150° of rotation arrives at the top position which is slightly below the bottom target of the stack 116. When the arm 5 and cams 194 and 31 arrive at about the 155° mark of angular travel, target escapement cam 194 causes the target escapement cushion 241 to begin opening. At the 170° position the cushion is retracted and the escapement is fully open and permits the entire stack 316 to drop a slight distance of about 15/32 of an inch to upraised feed shelf 126 thereby positioning the second from bottom target opposite the cushion 241. With the stack 316 thus supported, further rotation of cam 194 to about 245° permits the cushion 241 to grip the second from bottom target under the action of spring 271. After about 260 degrees of travel, feed shelf cam 31 lowers the shelf 126 carrying only a single target by about 1½ inches to a position in line with the carrier plate 33 where it is picked up and carried by the carrier plate 33, during about the last 20° of its angular travel to the cocked and ready-to-fire position. It is to be noted that the greatest target transfer movement is a movement of but a single supported target and not the entire stack. It is to be further noted that feed shelf 126 in coming up to take down a target from the stack stops just a bit short of meeting with the stack so as not to bump it, which would be likely to break one or more of the frangible targets.

Before target feed shelf 126 is lowered from its elevated position, at about the 240° mark of angular travel of the arm 5, the crank stud 45 has shot beyond its dead center by about 90° and begins to oscillate back or clockwise together with control cam 65. This sudden incipient movement of reversal causes planetary gears 70, 71 and 72 to tend to reverse ring gear 73 and drive it clockwise. But since reversal of ring gear 73 is prevented by the cocking pawl 91, inasmuch as at this position of the parts, follower 97 of the pawl has dropped opposite the receding portion 76 of control cam 65 and permits cocking pawl spring 98 to force tooth 96 of the pawl against ratchet 74 of gear 73, the only action of ring gear 73 is to exert a force on the cocking pawl 91 which causes a torque force on the hold back pawl 94 and brings about clockwise (FIGURE 6) movement of pawl 94 so that it too engages with ratchet 74 of gear 73, which under these circumstances of the mechanism is secured in stationary position. With ring gear 73 thus held stationary, rotation of the sun gear 62 causes planetary gears 70, 71 and 72 to move their studs 67, 68 and 69 in the counter-clockwise direction carrying control cam 65, main shaft 8 and the throwing arm 5 until mainspring crank stud 45 arrives at the out dead center at which position mainspring 6 is fully tensioned. However at about the out dead center position which corresponds to about 30° of angular movement before throwing arm 5 arrives at the cocked read-to-fire position, the target carried by descending target feed shelf 126 is picked up by carrier plate 33 and moved along by frictional forces with plate 33. During the last 90° rotation of main shaft 8 and of disc 15 with arm 109, the Geneva gear 14 is turned 90° to bring a new stack of targets 316 into position above the feed shelf 126. It is to be noted that with the escapement cushion 241 fully closed upon the lowermost target of those remaining in the stack 116, final descent of target feed shelf 126 has begun at about the 260° position of angular movement of arm 5 and cams 194 and 31, measured from the cocked position.

As soon as stud 45 passes beyond out dead center, the tendency of mainspring 6 in view of the stationary position of ring gear 73, held by pawl 94, is to cause the planetary gears 70, 71 and 72 to turn ahead rolling upon the internal teeth of the stationary ring gear 73 faster than motor 7 drives them. As a result, the effort of mainspring 6 is to drive motor 7 which in turn effects dynamic braking of the main shaft 8 and the arm 5 and the other parts carried on shaft 8. This feature of the mechanism of this invention eliminates the shock which ordinarily would occur just prior to and at placement of arm 5 in cocked ready-to-fire position. Such shock would disrupt the proper positioning of the target on the carrier plate 33.

When the control cam 65 during cocking has been turned to allow sear 79 to fall into notch 78, arm 5 has arrived at the cocked or ready-to-fire position. Here follower 97 has engaged with protuberant portion 75 of cam 65 and has lifted pawl 91 from ratchet 74 of gear 73. This permits gear 73 to turn clockwise again; and as a result of the change in direction, hold back pawl 94 is ejected from ratchet 74. Magnet 99 then engages with the pawl 94 and keeps it disengaged from ratchet 74 until the next cycle.

Figure 8:
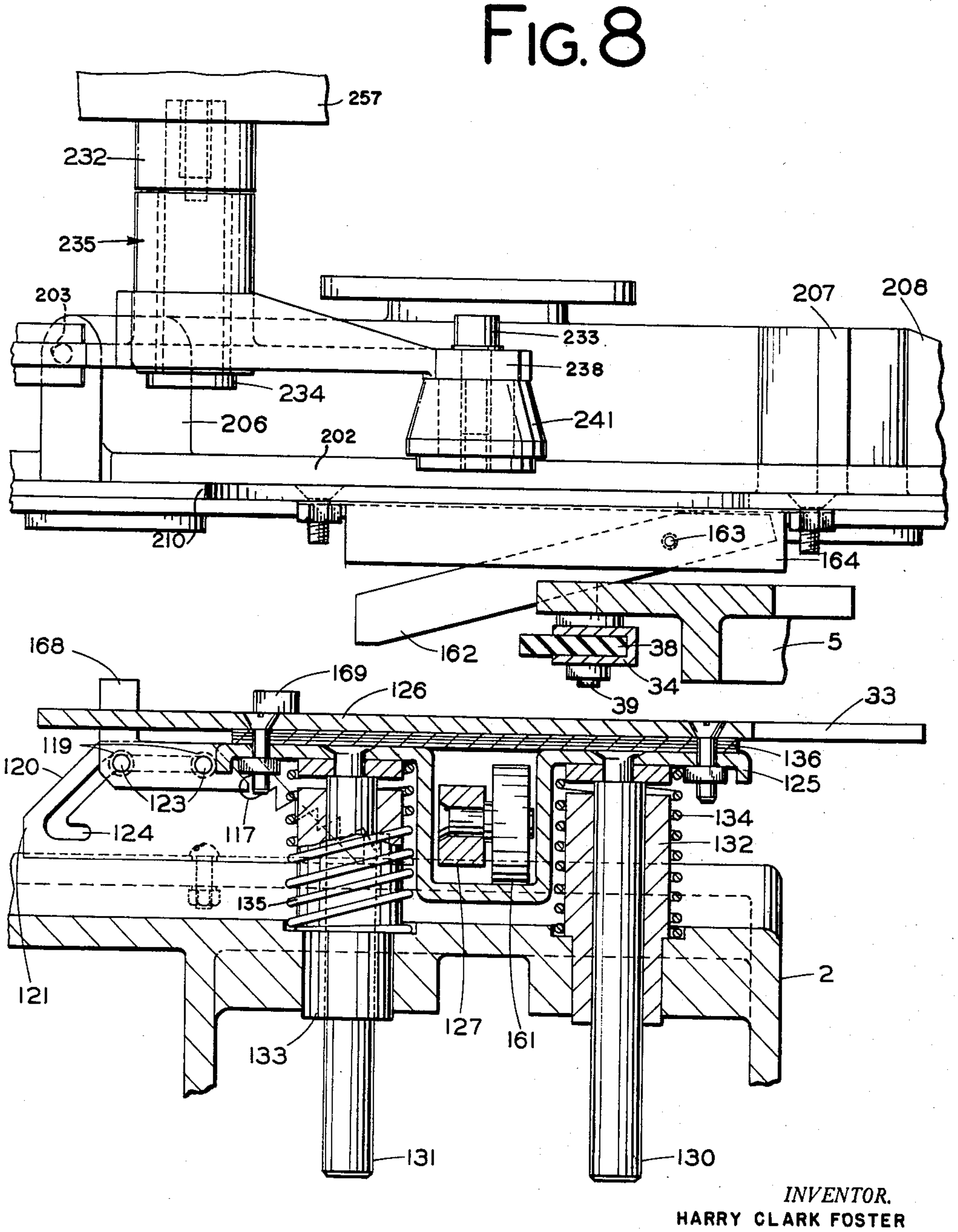
FIGURE 8 is an elevational fragmentary view partly in cross-section taken along line VIII—VIII of FIGURE 7.
Figure 10:
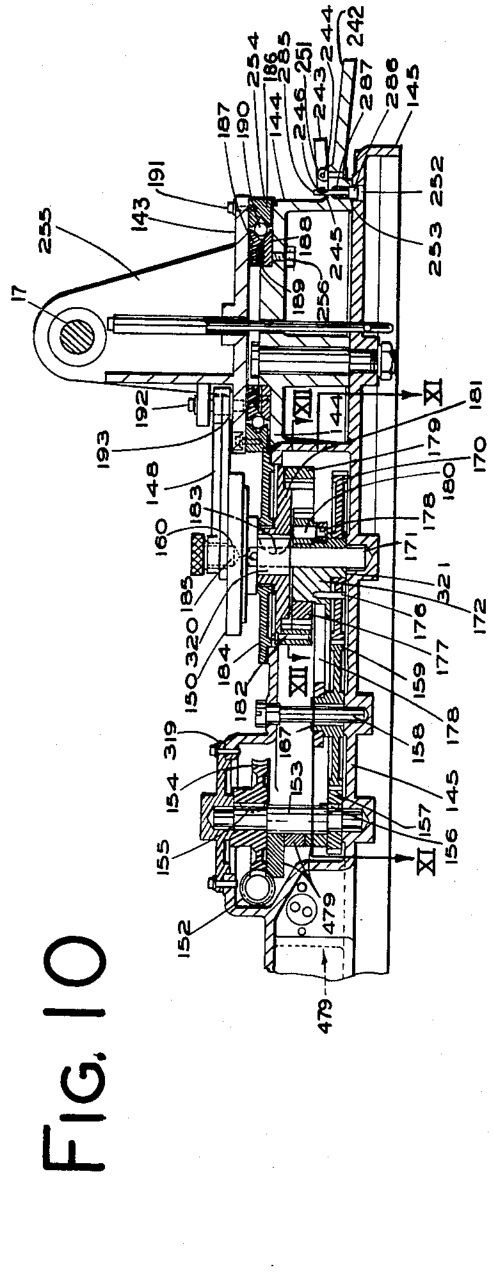
FIGURE 10 is an expanded elevational view developed along the line X—X of FIGURE 9.

It is to be noted (FIGURE 8) that the loaded target on carrier arm 5, just before the arm arrives in the last mentioned position, which is to say the ready-to-fire position, comes into contact with the target feed finger 162 pivotally mounted at 163 on a depending feed finger bracket 164 depending below annular portion 218 of the magazine base. Target feed finger 162 is yieldably held in position by gravity and is adapted to be turned up out of the way when carrier arm 5 is released to project the target. Until the target however is released feed finger 162 serves to guide the single target upon plate 33 to the ready-to-throw position against target stop finger 168 of assembly 120, and target guide button 169 located retractably on target shelf 126 (FIGURE 7). Stop finger 168 which serves to hold the target in the ready-to-throw position is pivotally and retractably mounted by means of pins 123 on bracket 121 which in turn is mounted on the frame 2. Target stop finger 168 is yieldably held to project upwardly into position by means of spring 117 one end of which is attached to finger 168 while the other is attached to bracket 121. Proper positioning of finger 168 is assured by slot 124 in bracket 121 (FIGURE 8). It is to be observed that when release switch 311 is closed to cause carrier arm 5 and its plate 33 and rail 34 to go into throwing operation, feed finger 162 moves up out of the way to clear arm 5 and stop finger 168 is turned down as carrier plate 33 passes over it. Under these circumstances the loaded target is free to commence movement on plate 33 along rail 34 and be thrown.

It is to be noted that slot 124 has a path which permits finger 168 to lock in a retracted position below the angular path of carrier 33. Finger 294 is similarly attached to bracket 121 and may be set in the retracted position during the operation of the trap for singles. However, in operation of the trap for doubles, the rotary magazine assembly 257 is removed from the trap and stop finger 168 and target guide button 169 are locked in their retracted position, whereas finger 294 is set to yieldingly protrude above the angular path of carrier 33. On the use of the trap for doubles, while the carrier 33 is in the cocked position, finger 294 together with rail 34 served as a guide and a holder for the outermost target which is placed against the finger and rail. The inner target is located by placing it against the outermost target and against rail 34. As can be clearly seen, the retraction of guide button 169 permits the inner target to be set and discharged without hindrance and/or obstruction.

Figure 2:
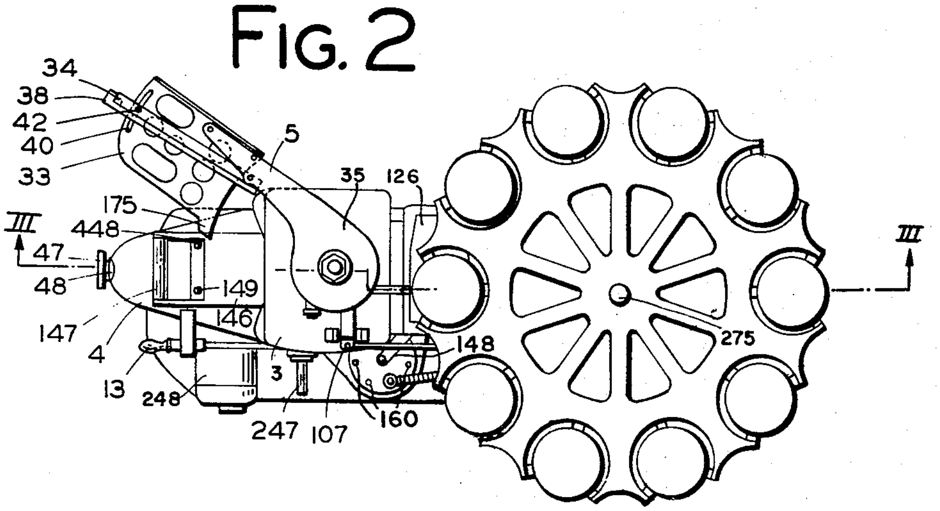
FIGURE 2 is a plan view of the embodiment of FIGURE 1.

When the switch 311 of the trap is open, and switch units 317 and 318 have been momentarily closed against contact 306 and 310 followed by their positioning into the neutral position, in which condition motor 7 is stopped, the trap after firing is inoperable and throwing arm 5 is in the fired position as shown in FIGURES 1 and 2. In this position, mainspring crank stud 45 is standing at the in dead center while within the gear housing 3 the control cam 65 is positioned so as to dispose notch 78 about 150° counter-clockwise from the cocked position shown in FIGURE 6. At this condition of the trap, sear 79 is resting upon the rim 77 of the control cam 65 out of notch 78 and at the same time follower 97 of the cocking pawl 91 is disposed beyond the trailing end of the protuberant portion 75 at the leading or initial portion of the recessed portion 76 of the control cam 65 which permits the cocking pawl finger 96 to rest in the ratchet teeth 74 of ring gear 73 under the force of compressed cocking pawl spring 98 while the hold back pawl 94 also rests in the ratchet teeth 74 into which it had been moved during the last previous manual firing operation as the stud 45 began to move back toward in dead center. With the parts of the mechanism thus positioned, it is evident that when the switch assembly 305 of the trap is closed against contacts 307 and 309, the first thing that happens as soon as the motor 7 has gone into continuous operation, is that sun gear 62 acting through planetary gears 70, 71 and 72, rolls the planetary gears, the control cam 65 and the arm 5 counter-clockwise (FIGURE 6) until sear 79 falls into notch 78, just before which time follower 97 on cocking pawl 91 rides up on protuberant portion 75 of control cam 65 causing the finger 96 of cocking pawl 91 to be disengaged from ratchet 74 of ring gear 73. This gear 73 then goes into clockwise motion the first effect of which is to throw the hold back pawl 94 toward magnet 99 which serves as a detent keeping hold back pawl 94 out of the ratchet of the idling ring gear 73. It is to be noted that on the first cocking stroke from the fired position, a target is fed from the magazine just as if the arm 5 had previously been cocked and gone through a complete cycle.

It is to be noted that when switch 312 is open, angling motor 248 is not activated, and the trap is not oscillated. When switch 312 is closed, the various components of the novel angling gear train are set in motion to deliver the novel angling function described above. With switch 312 open, and magazine 257 removed, the trap may be used for doubles by retracting stop finger 168 and guide button 169 and setting stop finger 294 to protrude above the angular path of carrier 33. In doubles the outermost target is placed on carrier 33 against finger 294 and rail 34, and the inner target against the outermost target and against rail 34. With trap motor activated, by closure of switch units 317 and 318, the two targets are discharged by closing switch 311 which activates solenoid 87 which sets the trap in operation in the sequence described above.

By closing switch 312 the various components of the novel gear train are set in motion to deliver the non-uniform angling function, to the trap, described above. It is to be noted that the activation of angling motor 248 is independent of the activation of trap motor 7 so that the trap mechanism may be operated individually and apart from the angling mechanism.

The magnitude or spread of the targets, by the angling mechanism is controlled by appropriate selection of one of the holes, in angle changing disc 150, into which angle changing link 148 is connected by means of spread adjusting screw 185. Correction for variation due to the effect of wind, is accomplished by appropriate selection of windage adjusting holes 252 into which windage adjusting pin 285 is inserted. Rotation of base 144 is facilitated by windage adjusting handle 242.

FIGURE 16 illustrates the distribution of targets across a field with respect to time (in seconds) and also with respect to the number of revolutions of drive gear 170 when angle changing link 148 was connected to an intermediate hole in angle changing disc 150. In the instant embodiment the specific gear train utilized produced a prolonged period of non-uniform oscillation embodying accelerating, decelerating, hesitating and reversing motions which was repeated after each time interval of slightly less than thirty-one seconds. It is to be understood that by substitution of various ratios of gears and linkage different results in operation of the angling mechanism can be obtained. For example, the length of time, at which the cycle is repeated may be lengthened or shortened, and also various changes in the amplitude of the dispersion curve can be obtained.

From the foregoing description it is obvious that in accordance with this invention a new and compact self-angling target throwing apparatus is provided with desirable operating characteristics. The apparatus of this invention has the further advantage of automatic loading of targets from a desirably large supply of them in a rotary magazine without the frequent and constant supervision of an operator and in timed relation with the cocking and throwing mechanisms. It is quite apparent that the apparatus of this invention is advantageous in the art of trap shooting and that the objects and advantages are accordingly accomplished.

Although the invention has been described with reference to specific embodiments and details, various modifications and changes will be apparent to one skilled in the art. The invention is, therefore, not to be limited by such embodiments and details except as set forth in the appended claims.

What is claimed is:

1. In a target throwing trap having a frame, a rotatable throwing arm, and a mainspring for moving the arm from a cocked position to a target throwing position, the combination comprising a motor for operating the trap, a rotary magazine detachably mounted on said frame having in annular arrangement a plurality of holders for stacks of targets, a main shaft rotatably mounted on said frame and carrying secured on one end of said shaft said throwing arm while the other end of said shaft is connected to said mainspring by means of a crank, motor driven means for automatically cocking said spring and positioning said throwing arm in a cocked position, a second means for restraining said arm in the cocked position and for releasing said arm to throw a target, said motor driven means and said second means imparting a complete revolution to said arm during sequential functions of said motor driven means and said second means, a third means mounted on said other end of said shaft to impart an intermittent rotary movement to said magazine to progressively index each of said holders during the cocking, positioning and releasing functions of said motor driven means and said second means in timed relation to the rotation of said shaft, target escapement means pivotally mounted on said magazine and adapted to be pivoted by said third means in timed relation to the rotation of said shaft with said third means actuating said escapement means away from and out of engagement with the periphery of a target at the bottom of the stack of targets to permit said stack of targets to drop in said magazine an amount not greater than the height of one of said targets whereby the target adjacent said bottom target is brought into alignment with said escapement means and said third means being adapted thereafter to actuate said escapement means into engagement with the periphery of the said aligned target adjacent the bottom target of the stack of targets carried in said magazine, loading means for transferring a target from said magazine to the arm before release in cooperation with said cocking means, said loading means comprising a target feed cam mounted on said first end of said shaft with said target feed cam having a varied operating surface, a target feed shelf, a vertically reciprocal mounting means operatively connected to said trap and adapted to move said shelf into spaced proximity with the lowermost target in said magazine, a pivotally mounted lever operatively connected to said reciprocal mounting means and said target feed cam for actuating said shelf with said lever being adapted to be pivoted by said target feed cam in timed relationship with said target escapement means and with said trap cocking, holding, releasing and throwing operations, a first portion of the said surface of said feed cam, said lever, said reciprocal mounting means and said third means being adapted after the arm is released to first elevate the target feed shelf near to the bottom of the stack of targets and then to disengage said escapement means from the lowermost target of the stack, thereby enabling the stack to come to rest upon the feed shelf, a second portion of the said surface of said feed cam in conjunction with said lever and said reciprocal mounting means being also adapted to actuate said shelf with the stack supported thereon to be lowered a sufficient distance to permit said escapement means actuated by said third means to thereafter engage with the second from the bottom target in the stack thereby supporting the remaining targets in the stack above and including the second from the bottom target, and a third portion of the said surface of said cam in conjunction with said lever and said reciprocal mounting means being additionally adapted to thereafter further lower the said shelf and the said bottom target to a position to enable the throwing arm as it is being brought to the cocked position to receive said target.

2. A target trap comprising, a frame, a motor for operating the trap, a rotary magazine detachably mounted on said frame and having in annular arrangement a plurality of holders for stacks of targets, a main shaft rotatably mounted on said frame, a target throwing arm secured on one end of said shaft, a mainspring, a crank secured to the other end of said shaft and connected to said mainspring, motor-driven means for automatically cocking said spring and positioning said throwing arm in a cocked position, a second means for restraining said arm in the cocked position and for releasing said arm to throw a target, said motor-driven means and said second means imparting a complete revolution to said arm during the sequential functions of said motor-driven means and said second means, a third means mounted on said other end of said shaft to impart an intermittent rotary movement to said magazine to progressively index each of said holders during the cocking, positioning and releasing functions of said motor-driven means and said second means, target escapement means pivotally mounted on said magazine and adapted to be pivoted by said third means in timed relation to the rotation of said shaft with said third means actuating said escapement means away from and out of engagement with the periphery of a target at the bottom of the stack of targets and into engagement with the periphery of a target adjacent the bottom target of the stack of targets to permit said stack of targets to drop in said magazine an amount not greater than the height of one of said targets whereby the target adjacent said bottom target is brought into alignment with said escapement means and said third means being adapted to thereafter actuate said escapement means into engagement with the periphery of the said aligned target adjacent the bottom target of the stack of targets carried in said magazine, and means to transfer a target freed by said escapement means from said magazine to said arm before release of said arm in cooperation wtih said cocking means.

3. In a target throwing trap having a rotatably mounted target throwing arm and a main power spring for moving the arm by means of a crank from a cocked position to effectuate throwing of the target, the combination comprising a frame, a motor for operating the trap, a rotary magazine detachably mounted on said frame and having in annular arrangement a plurality of holders for stacks of targets, a main shaft rotatably mounted on said frame and carrying secured at one end said throwing arm while the other end of said shaft is connected to said mainspring by means of said crank, a mechanism for automatically cocking the trap, a first means also mounted on said other end of said shaft to impart an intermittent rotary movement to said magazine to progressively index each of said holders in timed relation to the rotation of said shaft, a second means to progressively release a target, one at a time, from the bottom of successive stacks after each indexing motion of said magazine and a third means operatively connected to said trap and adapted for movement into close proximity with said target and for transferring a released target from the magazine to a point directly below and spaced from the point of release of said target for delivery to said target throwing arm.

4. The structure of claim 1 wherein said third means comprises a first gear mounted adjacent said crank on the other end of said main shaft, a second shaft rotatably mounted on said frame, a circular driving gear mounted on said second shaft having four radial slots spaced 90° apart and radially in its periphery four equally spaced arcuate concave surfaces intermediate said slots, a rotatable disc mounted on said frame having through an arc of about 270° a concentric peripheral surface of a radius having a sliding fit within the concave surfaces of said driving gear and having as a continuation of said surface through an arc of about 90° a peripheral notch forming a concave surface of a radius to permit free movement of the said driving gear within said notch, a radial arm secured to said disc adjacent said notch adapted to be moved into engaging relation successively within each of the slots of said driving gear, said driving gear and said disc being mounted in spaced relation to each other wherein the peripheral surface of said disc rotates in a sliding fit within, successively each of the concave surfaces of said driving gear after each indexing of said driving gear by said radial arm, a timing cam having a protuberant and a receding portion in its periphery and a second gear axially fixed on said disc, driving means linking said first and second gears, a third shaft rotatably mounted on said frame, a follower mounted on said third shaft adjacent one end thereof and attached to ride on said protuberant and receding portions of said timing cam, a lever mounted on the other end of said third shaft, actuating means operatively connecting said lever with said escapement means and adapted to pivot said escapement means to the aforesaid position out of engagement with the periphery of a target, and magazine driving means mounted on the other end of said second shaft and adapted to rotate said magazine.

5. The structure of claim 2 wherein the third means comprises a first gear mounted adjacent said crank on the said other end of said main shaft, a second shaft rotatably mounted on said frame, a circular driving gear mounted on said second shaft having four radial slots spaced 90° apart and radially in its periphery four equally spaced arcuate concave surfaces intermediate said slots, a rotatable disc mounted on said frame having through an arc of about 270° a concentric peripheral surface of a radius having a sliding fit within the concave surfaces of said driving gear and having as a continuation of said surface through an arc of about 90° a peripheral notch forming a concave surface of a radius to permit free movement of said driving gear within said notch, a radial arm secured to said disc adjacent said notch adapted to be moved into engaging relation successively within each of the slots of said driving gear, said driving gear and said disc being mounted in spaced relation to each other wherein the peripheral surface of said disc rotates in a sliding fit within, successively, each of the concave surfaces of said driving gear after each indexing of said driving gear by said radial arm, a timing cam having a protuberant and a receding portion in its periphery and a second gear axially fixed on said disc, driving means linking said first and second gears, a third shaft rotatably mounted on said frame, a follower mounted on said third shaft adjacent one end thereof and attached to ride on said protuberant and receding portions of said timing cam, a lever mounted on the other end of said third shaft, actuating means operatively connecting said lever with said escapement means and adapted to pivot said escapement means, to the aforesaid position out of engagement with the periphery of a target, a magazine driving means mounted on the other end of said second shaft and adapted to rotate said magazine.

6. The structure of claim 3 wherein the second and third means comprise a first gear mounted adjacent said crank on the other end of said main shaft, a second shaft rotatably mounted on said frame, a circular driving gear mounted on said second shaft having four radial slots spaced 90° apart and radially in its periphery four equally spaced arcuate concave surfaces intermediate said slots, a rotatable disc mounted on said frame having through an arc of about 270° a concentric peripheral surface of a radius having a sliding fit within the concave surfaces of said driving gear and having as a continuation of said surface through an arc of about 90° a peripheral notch forming a concave surface of a radius to permit free movement of said driving gear within said notch, a radial arm secured to said disc adjacent said notch adapted to be moved into engaging relation successively within each of the slots of said driving gear, said driving gear and said disc being mounted in spaced relation to each other wherein the peripheral surface of said disc rotates in a sliding fit, successively, within each of the concave surfaces of said driving gear after each indexing of said driving gear by said radial arm, a timing cam having a protuberant and a receding portion in its periphery and a second gear axially fixed on said disc, driving means linking said first and second gears, a third shaft rotatably mounted on said frame, a follower mounted on said third shaft adjacent one end thereof and attached to ride on said protuberant and receding portions of said timing cam, a lever mounted on the other end of said third shaft, actuating means operatively connecting said lever with said second means, and magazine driving means mounted on the other end of said second shaft and adapted to rotate said magazine.

References Cited in the file of this patent

UNITED STATES PATENTS

| | | |
|---|---|---|
| 1,819,567 | North | Aug. 18, 1931 |
| 1,971,056 | Sutcliffe | Aug. 21, 1934 |
| 2,267,525 | Kemp | Dec. 23, 1941 |
| 2,310,746 | Parker et al. | Feb. 9, 1943 |
| 2,652,820 | Darrell | Sept. 22, 1953 |
| 2,656,831 | Puth | Oct. 27, 1953 |
| 2,668,526 | Woolsey | Feb. 9, 1954 |
| 2,711,163 | Richardson | June 21, 1955 |
| 2,711,726 | Darrell | June 28, 1955 |
| 2,827,036 | Ervine et al. | Mar. 18, 1958 |